Sept. 12, 1944.    C. T. RAY    2,358,281
TRACTOR DRAFT ATTACHMENT FOR IMPLEMENTS
Filed Jan. 14, 1941    3 Sheets-Sheet 1
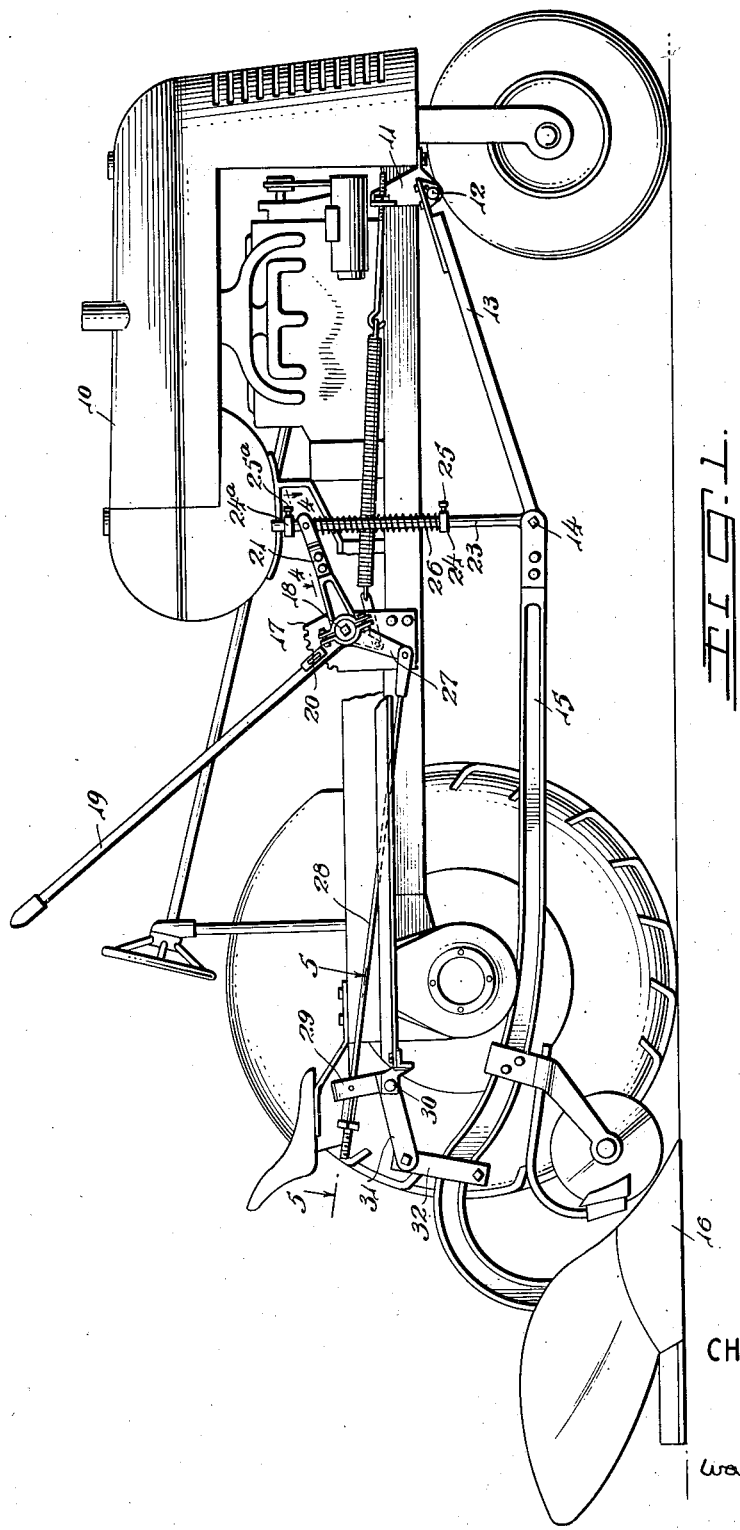
Inventor
CHARLES T. RAY
Walter W. Burns
Attorney

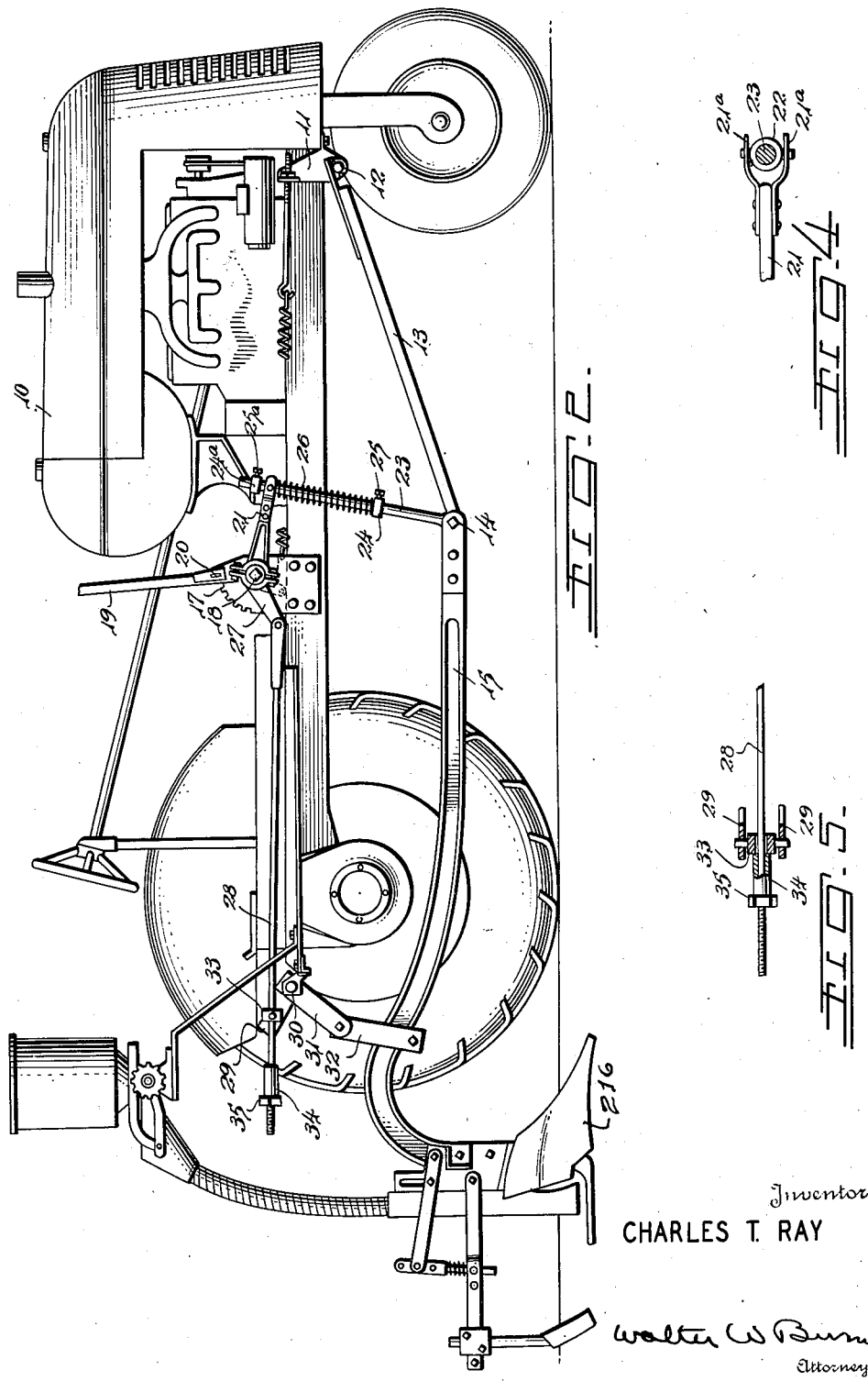

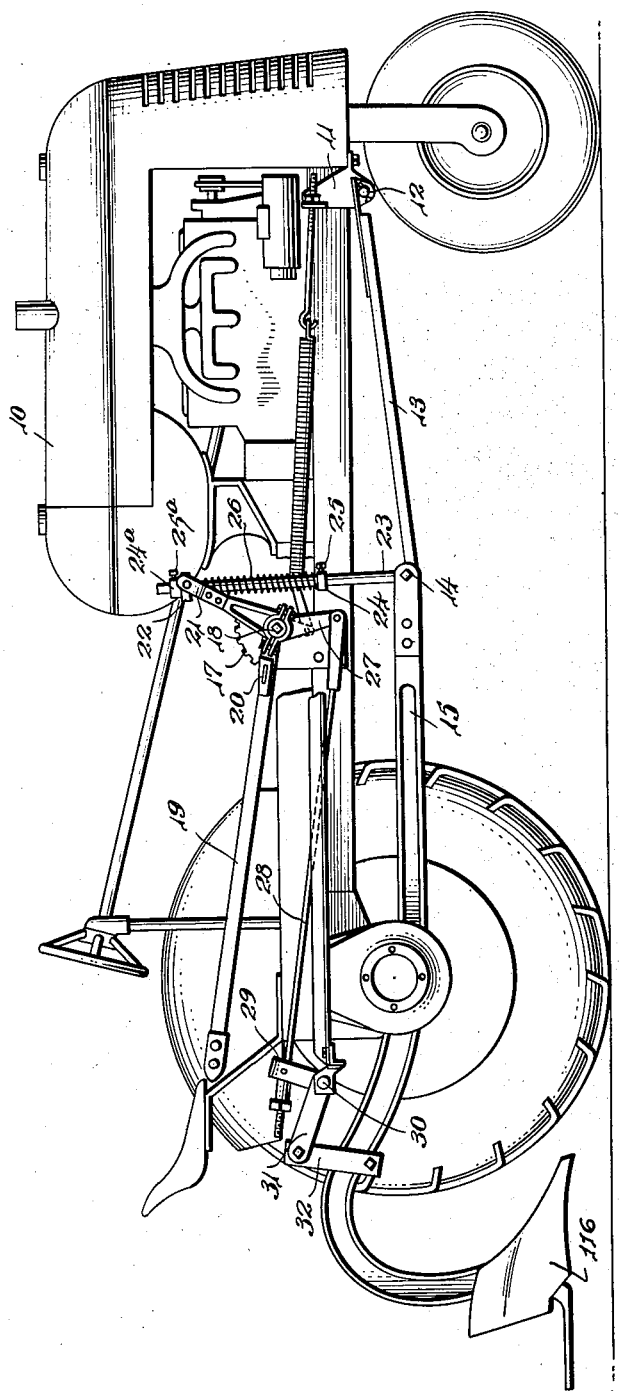

Patented Sept. 12, 1944

2,358,281

UNITED STATES PATENT OFFICE 2,358,281

TRACTOR DRAFT ATTACHMENT FOR IMPLEMENTS

Charles T. Ray, Louisville, Ky., assignor to B. F. Avery and Sons Company, Louisville, Ky., a corporation of Delaware Application January 14, 1941, Serial No. 374,394

19 Claims. (Cl. 97—47)

This invention relates to tractor attachments for agricultural implements and has particular relation to draft attachments for implements such as plows, middle bursters, listers and the like.

In the use of ground working implements when attached to tractors it has been found difficult to keep the earth working member of the implement in the ground at a constant depth and thereby insure a uniform furrow or working of the ground.

The primary object of this invention is the provision of an improved tractor connecting means for a ground working implement.

Another object of the invention is the provision of an improved connector for attaching a ground working implement to a tractor wherein an increase in the load due to the ground working member going deeper into the ground by the undesirable lowering of the forwardly extending member of the implement, will automatically cause the raising of the implement's forwardly extending member and the return of the ground working member to its predetermined depth.

Another object of the invention is the provision of a connecting means for plows, middle bursters, listers and the like wherein a draft means pivoted at its forward end to the tractor has its rear end pivoted to the forward extending pulling member of the implement with its rear pivot below a line drawn from its forward pivot to the center of load on the ground working member and having this rear connection yieldable in an upward direction.

A further object of the invention is the provision of an improved tractor connecting means for a ground working implement wherein a decrease in the load as when the tractor might go over a rise in the ground and start the plow out of the earth, will be counteracted by means to guide the plow deeper into the ground, thus maintaining, between ordinary condition limits, a constant depth of furrow.

A still further object of the invention is the provision of an improved connection means between a tractor and a ground working implement whereby an elongated member is pivoted at its forward end to the tractor and is pivoted at its rearward end to the implement in such a way that the connection will have a normal tendency to rise, with resilient means to effect a yielding pressure on the connection in a downward direction.

Other and further objects of the invention will be apparent to those skilled in the art from a reading of the complete specification and claims.

Referring to the drawings wherein is illustrated an embodiment of the invention with several applications thereof, Fig. 1 is a side view of the invention as applied to a turning plow.

Fig. 2 is a side elevation of the invention as applied to a lister.

Fig. 3 is a side elevation of the invention as applied to a middle burster.

Fig. 4 is a detail sectional view on the line 4—4 of Fig. 1.

Fig. 5 is a detail sectional view on the line 5—5 of Fig. 1.

In the figures, various parts of the implements and tractor have been omitted as their illustration is not essential to illustrate the operation of the invention.

In the drawings, 10 designates generally the tractor. At the forward end of its frame is secured a plate or other securing means 11 which carries a forward pivot 12 of an elongated draft member 13 which in the illustrated embodiment is a bar or pipe extending downwardly and rearwardly from the pivot 12.

At the rear end of the draft member is pivotally secured, at 14, the forward extending member 15 of the ground working implement which is here illustrated as the forward end of a turning plow 16. It is to be noted that the pivot 14 is substantially in a mid-position of the fore-and-aft tractor wheel base. This insures a minimum of movement of up and down movement of the forward end of the implement as the tractor passes over uneven ground.

On the frame of the tractor 10 is suitably secured bearings as exemplified by the quadrant 17. In these bearings is journaled a shaft 18 which is moved to adjusted positions by the hand lever 19. The usual detent 20 operated by the conventional grip lever located at the outer end of the hand lever 19 is provided.

Mounted on and rigid with the shaft 18 is a bell crank lever 21 having a pair of arms 21a in and between which are journaled trunnions of a trunnion ring 22. Slidably mounted in the trunnion ring 22 is a link 23 which is pivoted at its lower end on the pivot 14.

A set collar 24 is mounted on the link 23 and is provided with a set stud 25 to hold the collar 24 in any one of many adjusted positions. Between the set collar 24 and the trunnion ring 22 is a spring 26. A second set collar 24a with its set stud 25a is provided on the link 23 above the trunnion ring 22.

An additional bell crank arm 27 is secured to the shaft 18 and has a pivot at its outer end to which is pivoted the forward end of an operating rod 28. The rear end of the operating rod 28 is pivotally connected to an arm 29 of a bell crank shaft 30. Another arm 31 is secured to the shaft 30 and is pivoted at its outer end to a link 32 which is pivoted at its lower end to the rear portion of the forwardly extending member 15—in Fig. 1, the beam of the turning plow 16.

Details of construction of the parts 27, 28, 29, 30, 31 and 32 in connection with the lifting mechanisms of plows, middle bursters, listers and the like are fully disclosed and explained in my copending applications S. N. 374,127, 374,129, filed January 11, 1941; S. N. 374,393 and 374,395, filed January 14, 1941, and as these parts are not per se a part of this invention, their details of construction will not be more fully described.

In operation, the hand lever 19 is moved rearwardly from the position shown in Fig. 1 and the earth working member will be lifted by the parts 27, 28, 29, 30, 31 and 32 until the earth working member 16 is clear of the ground for transport.

Moving the hand lever 19 forward, moves the crank arm 21 downwardly, lowering the forward end of the beam 15. Since the operating rod 28 slips through a trunnion ring 33 (Fig. 5) and has a loose sleeve 34 held on the rod 28 by the nuts 35, the rod 30 first lowers the plow member to the ground and further movement permits the rear end to find its own level. The forward end of the beam 15 is pushed further down to guide the plow member into the ground and the forward movement of the tractor causes the point of the plow member to enter the ground.

Assuming that the hand lever 19 has been moved to a forward position and the detent 20 set to correspond with the predetermined depth to which the plow member is to go for operation, the plow member will enter the ground and be drawn lower and lower until it reaches a point where it will travel horizontally.

As the pivot 14 is below a line drawn from the center of the pivot 12 to the center of load of the plow member, the resultant action of the forward and upward pull of the draft bar and the rearward pull on the pivot 14 from the beam 15 causes a tendency of the pivot 14 to rise.

But the limb 23 pushing upwardly on the set collar 24 will force the spring 26 to push upwardly on the arm 21 through the trunnion ring 22. The spring 26 pushing downwardly and the link 23 being pushed upwardly by the tendency of the pivot 14 to rise, will cause a balanced condition which will maintain all parts in their relative positions until acted upon by some other force. If the operative changes the position of the hand lever 19, another balance has to be made.

Let us assume the earth working member to be moving through the earth at the desired depth, and the suction of the plow member to be pulling it under the ground surface. If the front end of the tractor should go over a slight rise in the ground, the tendency will be for the plow to rise. This tendency will lighten the backward pull on the beam 15 and decrease the upward push on the link 23. As this takes place, the spring 26 immediately reacts and pushes the link downwardly lowering the position of the beam 15 and leading the earth working member deeper into the ground. It is thus seen that in the case of a slight rise of one end of the tractor, the tendency of the tractor to lift the plow is counteracted and a uniform depth is maintained.

When a depression is met by the front wheel of the tractor, the forward end of the tractor is lowered. This drops or has a tendency to drop the forward end of the beam 15. In turn, the lowering of the forward end of the beam 15 makes the earth working member go deeper. This causes a greater backward pull on the beam, compresses the spring 26 and again raises the forward end of the beam 15.

These tendencies of the change in load due to raising and depressing the forward end of the tractor react at once to keep the balance always steady thus maintaining a substantially constant depth of operation of the earth working member. As the spring 26 through its guide rod 23 always presses downwardly in a manner to tend to lower the forward end of the beam 15, it is obvious that the connection (at 14) will always be below a line drawn from the tractor connection to the center of load of the implement.

The construction and operation of this invention in connection with the plow member of the turning plow is the same as with the plow or other earth working member of the middle burster 116 or earth working member 216 of the lister or other implement having a forwardly extending beam or other member which operates in a similar manner.

It will thus be seen that I have not only produced a draft attachment which will more nearly approach the true draft sought by the operative using a hand plow—with uniform depth of earth working—than can be done by hand control, but that I have also produced means for doing it automatically.

While I have illustrated and described my invention in detail and disclosed it in connection with a plow, lister and middle burster, it is to be understood that the invention is not limited to the exact details of construction or uses shown but that changes and modifications may be made and that the invention may be used in connection with other implements without departing from the spirit of the invention and within its scope as claimed.

Having described my invention what I claim is:

1. In combination of a tractor-drawn implement having suction, a draft member whose front end is pivotally connected to the tractor and its rear end pivotally connected to the implement, a resilient means for normally holding the rear end of the draft member below a straight line between the front end of the draft member and the center of load of the implement and adjustable means for regulating the depth at which the implement operates, said resilient means actuated by the force derived from the tendency of the rear end of the draft member to come in direct line between the front end of the draft member and the center of load produced by pulling the implement.

2. In combination, a tractor attachment comprising a draft member for pivoted connection to a tractor, an implement having suction and provided with a ground working member and a forwardly extending member, the rear end of the ground working member having means to constrain it to free movement in a vertical plane when the implement is in working position, the forward end of the forward extending member being connected to the draft member rearward of its tractor connection and resilient means in position to automatically act upon the forward end of the forward extending member to tend to keep its forward end at a predetermined height above the ground as the wheels go over rough ground and below a straight line drawn from the tractor connection to the center of load of the implement.

3. In combination, a tractor attachment comprising an implement having suction, draft means including a member extending forwardly from the implement and a draft member pivotally connected to the forward portion of the forwardly extending member at one end and having its forward end pivotally connected to the tractor, a downwardly operating resilient means operative to force the connection between the forwardly extending member and draft member, below a line drawn from the tractor connection of the draft member to the center of load of the plow.

4. In combination, a tractor attachment comprising an implement having suction, draft means including a member extending forwardly from the implement and a draft member pivotally connected to the forward portion of the forwardly extending member at one end and having its forward end pivotally connected to the tractor, a downwardly operating resilient means operative at the connection between the forwardly extending member and draft member to maintain the connection below a straight line drawn from the tractor connection of the draft member to the center of load of the implement.

5. In combination, a tractor attachment comprising an implement having suction, draft means including a member extending forwardly from the implement and a draft member pivotally connected to the forward portion of the forwardly extending member at one end and having its forward end pivotally connected to the tractor, a downwardly operating resilient means operative at the connection between the forwardly extending member and draft member to maintain the connection below a straight line drawn from the tractor connection of the draft member to the center of load of the implement, and adjustable means for controlling the effective position of the resilient means.

6. In combination, a tractor attachment comprising a draft bar pivotally secured at its forward end to the tractor, an implement having suction and provided with a forwardly extending member pivotally secured to the rear end of the draft bar, means constraining the implement at the rear of its connection to the draft bar, to movement in a vertical plane, and resilient means pressing the connection of the implement to the draft bar, below a straight line from the tractor connection to the center of load of the implement, the resilient means tending to counteract the tendency of the ground resistance to raise the implement connection toward the straight line between tractor connection and center of load.

7. In combination, a tractor attachment comprising an implement having suction and provided with a forwardly extending member, a draft member pivotally connected to the forward end of the forwardly extending member at its rear end and having its forward end provided with a pivotal connection for attachment to the tractor, resilient means for forcing the pivotal connection below a line drawn from the pivotal connection to the tractor, to the center of load of the implement and means for adjustably controlling the tension of the resilient means to thereby control the height of the forward end of the forwardly extending member, the implement being free for vertical movement under the control of the height controlling means.

8. The combination of a tractor attachment comprising an implement having suction and provided with a forwardly extending member, a draft member pivotally connected to the forward end of the forwardly extending member and having its forward end provided with a pivotal connection for attachment to the tractor, spring means for forcing the pivotal connection between the two members to a position below a line drawn between the pivotal connection to the tractor and the center of load of the implement and means including a hand operated member for adjustably controlling the height of the forward end of the forwardly extending member, the implement being free for vertical movement under control of the height controlling means.

9. In combination, a tractor attachment comprising an implement having suction and provided with a forwardly extending member, a draft member pivotally connected to the forward end of the forwardly extending member and having its forward end provided with a pivotal connection for attachment to the forward end of the tractor, resilient compression means for forcing the pivotal connection between the two members below a line drawn from the pivotal connection to the tractor and the center of load of the implement and means including a hand operated bell crank lever for adjustably controlling the height of the forward end of the forwardly extending member, the implement being free for vertical movement under control of the height controlling means.

10. In combination, a tractor attachment comprising an implement having suction and provided with a forwardly extending member, a draft member pivotally connected to the forward end of the forwardly extending member at its rear end and having its forward end provided with a pivotal connection for attachment to the tractor, resilient means pressing downwardly on the pivotal connection which joins the draft member and the forwardly extending member to force the connection below a straight line drawn from the pivotal connection to the tractor through the center of load of the implement, the resilient means pressing downwardly against the tendency of the forward force of the tractor to move the connection toward the straight line, these forces counteracting each other and maintaining a balance during the forward movement of the implement under varying ground conditions.

11. In combination, a tractor attachment comprising an implement having suction and provided with a forwardly extending member, a draft member pivotally connected to the forward end of the forwardly extending member at its rear end and having its forward end provided with a pivotal connection for attachment to the tractor, resilient means pressing downwardly on the pivotal connection which joins the draft member to the forwardly extending member to force the connection below a straight line drawn from the pivotal connection to the tractor to the center of load of the implement, the resilient means forcing downwardly against the tendency of the forward force of the tractor to move the connection toward the straight line, these forces counteracting each other and maintaining a balance during the forward movement of the implement under varying ground conditions, the resilient means including a rod and an adjustable spring surrounding the rod.

12. In combination, a tractor attachment comprising an implement having suction and provided with a forwardly extending member, a draft member pivotally connected to the forward end of the forwardly extending member at its rear end and having its forward end pivotally connected to the tractor, resilient means pressing downwardly on the pivotal connection which joins the draft member to the forwardly extending member to force the connection below a straight line drawn from the tractor pivotal connection to the center of load of the implement, the resilient means including a sliding rod and an adjustable spring surrounding the rod and operatively connected to the forward end of the forwardly extending member and resisting displacement from its operative position.

13. In combination, a tractor attachment comprising an implement having suction and provided with a forwardly extending member, a draft member pivotally connected to the forward end of the forwardly extending member at its rear end and having its forward end provided with a pivotal connection for attachment to the tractor, resilient means pressing downwardly on the pivotal connection which joins the draft member to the forwardly extending member to force the connection below a straight line from the pivotal tractor connection to the center of load of the implement, the resilient means including a sliding rod and an adjustable spring surrounding the rod and operatively connected to the forward end of the forwardly extending member and resisting displacement from its operative position.

14. In combination, a tractor attachment comprising an implement having suction and provided with a forwardly extending member and a ground working means, means for connecting the forwardly extending member to a tractor and spring means for automatically changing the height of the forward end of the forwardly extending member relative to the height of the tractor body to maintain uniform depth of furrow and draft while the tractor is passing over uneven ground surface, the resilient means maintaining the forward end of the forwardly extending member at a point below a straight line from the tractor connection to the center of load of the implement.

15. In combination, an implement having suction and provided with a forwardly extending member and a ground working means, means for connecting the forwardly extending member to a tractor and spring means controlled by the draft required to pull the implement for offsetting the tendency toward increasing or decreasing penetration caused by rough ground, by changing the angle of the bottom of the ground working means relative to the line of travel, to keep the forward end of the forwardly extending member at a constant predetermined height, the spring means maintaining the forward end of the forwardly extending member at a point below a straight line drawn from the tractor connection to the center of load of the implement.

16. In combination, an implement having suction and provided with a forwardly extending member and a ground working member, means connecting the forwardly extending member to a tractor and resilient means controlled by the draft required to pull the implement to automatically change the relative height of the forwardly extending members to the tractor body to maintain uniform depth of furrow and draft while the tractor is passing over an uneven ground surface, the resilient means maintaining the forward end of the forwardly extending member at a point below a straight line drawn from the tractor connection to the center of load of the implement.

17. In combination, a tractor attachment comprising an implement having suction and provided with a forwardly extending member, means connecting the forwardly extending member to the tractor and including resilient means opposing the action of the draft of the implement and pressing down the front end of the forwardly extending member to a variable position below a straight line from the tractor connection to the center of load of the implement, maintaining the implement at a predetermined depth in the ground as the tractor passes over uneven ground surfaces.

18. In combination, a tractor attachment comprising an implement having suction and provided with a forwardly extending member, a draft bar pivotally connected to the forwardly extending member at its rear end and pivotally connected to the tractor at its forward end and resilient means opposing the action of the draft of the implement and pressing down the front end of the forwardly extending member to a variable position below a straight line from the tractor connection to the center of load of the implement, maintaining the implement at a predetermined depth in the ground as the tractor wheels pass over uneven ground surfaces.

19. In combination, a tractor attachment comprising an implement having suction and provided with a forwardly extending member and a floating rear end when in working position, elongated means connecting the forwardly extending member to the tractor and resilient means actuated by the draft of the implement and pressing down the front end of the forwardly extending member to a variable position below a straight line from the tractor connection to the center of load of the implement, maintaining the implement at a predetermined depth in the ground.

CHARLES T. RAY.